United States Patent [19]

Belanger

[11] 4,021,072
[45] May 3, 1977

[54] INNER DOOR PULL FOR AUTOMOBILES
[75] Inventor: Wilfred E. Belanger, Rochester, Mich.
[73] Assignee: U.S. Industries, Inc., New York, N.Y.
[22] Filed: Oct. 31, 1975
[21] Appl. No.: 627,673
[52] U.S. Cl. .............................. 296/71; 296/146
[51] Int. Cl.² ...................................... B60N 3/02
[58] Field of Search .......... 296/71, 146; 16/110 R, 16/DIG. 24

[56] References Cited
UNITED STATES PATENTS
3,531,822 - 10/1970 Bush .............................. 16/110 R FOREIGN PATENTS OR APPLICATIONS
216,172 7/1966 Sweden .......................... 296/146
1,174,605 1/1967 United Kingdom .............. 296/146

Primary Examiner—Joseph F. Peters, Jr.
Assistant Examiner—Gene A. Church
Attorney, Agent, or Firm—Price, Heneveld, Huizenga & Cooper

[57] ABSTRACT

The specification discloses an automobile inner door pull having an elongated body of a resilient molded plastic material which contains a reinforcing longitudinal metal insert and a longitudinal cavity for a rich cushiony feel.

17 Claims, 6 Drawing Figures

INNER DOOR PULL FOR AUTOMOBILES

BACKGROUND OF THE INVENTION

1. Field of the Invention

This invention relates to an article for and method of manufacturing an automobile door pull

2. Description of the Prior Art

It is known to fabricate automobile door pulls by forming a metal strap, cutting an appropriately shaped covering material and then sewing the covering material over the metal strap. The number of fabricating steps and the complexity of each fabricating step make this a particularly expensive fabrication technique. This expense is particularly disadvantageous because it must be multiplied by the number of door pulls used in an automobile and by the number of automobiles using the door pulls. Clearly, even a relatively small expense per unit can become a rather substantial expense to the automobile manufacturer.

The prior art also teaches injection molding of a plastic material over a metal strap. A door pull so fabricated has a characteristicly hard feel. Typically, an automobile purchaser or user, particularly of a high priced car, can be expected to react adversely to such a hard feel. Such a hard feel can evoke images of cost cutting and is particularly undesirable in a relatively expensive item such as an automobile which attempts to provide an ambience of comfort and security. The fabrication process itself can have problems which include the time consuming process of correctly positioning a metal strap in a mold. If the metal strap is out of place in the mold a defective part may result because of protruding metal from the finished part. Scrapping such parts results in raising the cost of producing usable automobile door pulls.

SUMMARY OF THE INVENTION

The door pull in accordance with this invention includes an elongated body of resilient material containing an elongated metal insert and an elongated cavity. The cavity provides for easy deflection of the resilient material to provide for a cushiony feel. The metal insert may be removable from the body of resilient material to permit replacement of the resilient material when it has worn out or the like. Not having to replace the metal insert reduces the cost of replacement.

A method of fabrication in accordance with an embodiment of this invention uses removable cores in a mold to form an elongated cavity within the body of the door pull. The cavity of the door pull can preferably be large enough both to receive a metal insert and to provide a cavity for the deflection of the resilient material. Forming the resilient body of the door pull without the metal insert is advantageous in one sense because it eliminates all alignment problems with the metal insert and results in fewer defective parts. Even if the body of resilient material is formed around the metal insert, the removable cores which provide the cavity within the body can be used to assist aligning the metal insert thereby reducing the time required for alignment and the possibility of a misalignment resulting in scrap parts. Fabrication and scrap expenses are reduced.

DETAILED DESCRIPTION

Figure 3:
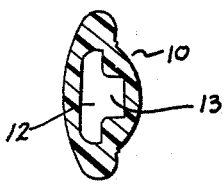
FIG. 3 is a cross sectional view along section line III—III of FIG. 2.
Figure 4:
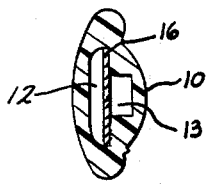
FIG. 4 is a cross sectional view along section line IV—IV of FIG. 1.

Referring to the drawings, the automobile door pull has an elongated molded body 10 with an interior cavity 12, a slightly smaller adjacent cavity 13 and flap ends 14. Body 10 is molded of a resilient, flexible resinous material such as soft polyvinyl chloride. Cavity 12 extends entirely through body 10 from one end flap 14 to the other. Cavity 12 has a cross sectional dimension sufficient to receive and support a metal insert 16, and is preferably slightly larger in cross section than is insert 16 so as to give the pull a cushiony feeling when one grips it (FIGS. 3 and 4). Adjacent front cavity 13 is somewhat smaller in cross section than cavity 12 so that insert 16 won't slip into it. Cavity 13 also preferably extends the length of body 12 from one flap 14 to the other.

Metal insert 16 is of a sufficient strength to sustain the loads which can be applied when closing an automobile door. The length of body 10, including flaps 14, is sufficient to prevent metal insert 16 from becoming exposed to sight when installed.

Figure 1:
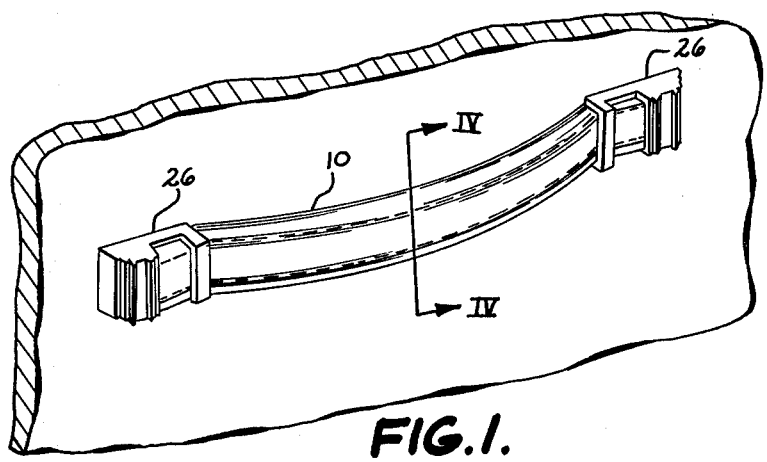
FIG. 1 is a front perspective view of an automobile door pull mounted on an automobile door (shown fragmentally) in accordance with an embodiment of this invention.
Figure 2:
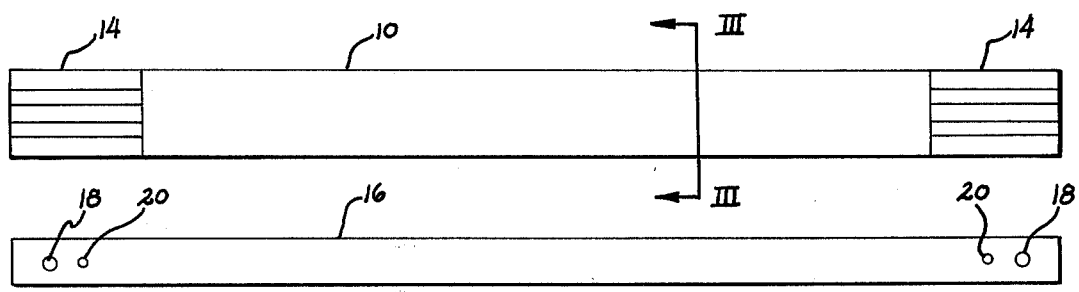
FIG. 2 is a rear elevation view of a metal insert and the body which encases it in accordance with an embodiment of this invention.
Figure 5:
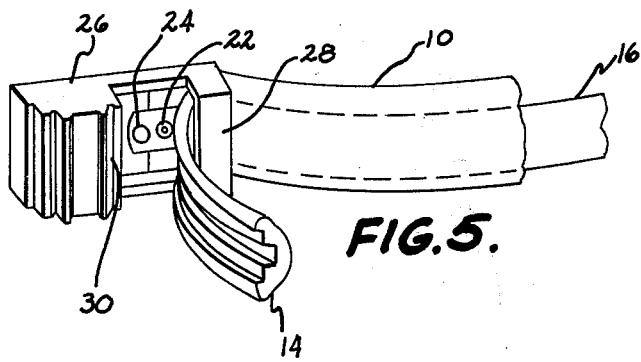
FIG. 5 is a view of a partially assembled end portion of an automobile door pull in accordance with an embodiment of this invention.
Figure 6:
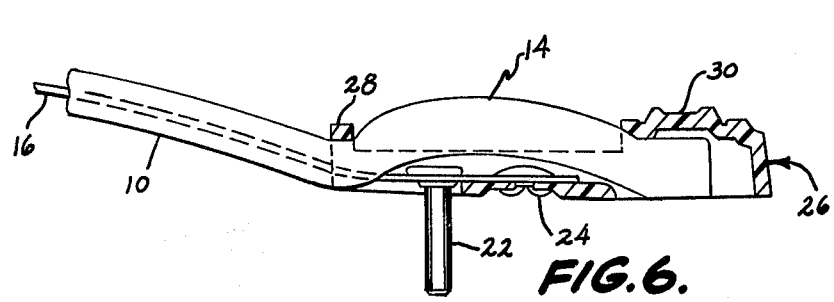
FIG. 6 is a side view, partially in cross section, of an end of an automobile door pull in accordance with an embodiment of this invention.

Metal insert 16 has a pair of holes 18 and a pair of holes 20 near the extremities of insert 16 for mounting the door pull at the two ends of the pull to an automobile door (FIG. 2). Holes 20, the innermost pair of the holes, are used to pass a mounting pin 22 through metal insert 16 and into an automobile door (FIGS. 5 and 6). The outer pair of holes 18 are used to pass a fastener 24 which connects metal insert 16 to an end cap 26. End cap 26 has two retaining bars 28 and 30 going across the width of flap 14 and spaced so the bars are on each side of the connection of metal insert 16 to the automobile door. As a result, flap 14 passes under bar 28 and can be lifted, as is shown in FIG. 5, to provide easy access for the fastening of end cap 26 by fastener 24 and the insertion of pin 22. After the door pull has been secured to the automobile door, the end of flap 14 is tucked in under retaining bar 30 and concealed from view.

FABRICATION

An injection mold having a cavity in the shape of the exterior of body 10 has a removable core in the shape of adjacent cavities 12 and 13 inserted into it. The mold includes a rich, textured interior surface and, in the case of the embodiment shown, stitching marks to suggest hand sewing. A material such as a relatively soft polyvinyl chloride is injected into the mold and removed when sufficiently hard. The removable core is also removed from cover 10 and metal insert 16 is inserted into the cavity 12 while the material of body 10 is between about 100° and 120° F. Some slight shrinkage which occurs during the cooling period helps to secure metal insert 16 within body 10.

The advantages of coring cavity 12 are twofold. First, the problem of placing metal insert 16 in a mold, including possible misalignment thereof, are eliminated. Secondly, a slight oversize can be created, i.e. making cavity 12 slightly larger in cross section than insert 16. This helps give the pull a rich, spongey feeling.

However, an alternative embodiment of this invention, metal insert 16 is positioned in the injection mold along with an adjacent removable core for cavity 13 and perhaps even an adjacent removable core on the other side to make cavity 12 slightly oversized. The use of the removable cores with metal insert 16 is particularly advantageous because they help to support metal insert 16 while it is in the mold thereby preventing it from moving out of place in the mold and subsequently protruding from cover 10. As before, a plastic material such as polyvinyl chloride is injected into the mold and removed when it has sufficiently solidified. The removable cores are removed from within cover 10 thereby forming at least the desired cavity 13 and preferably some oversize in cavity 12 which enshrouds insert 16. Metal insert 16 remains within body 10.

The result is a door pull which has been relatively inexpensively fabricated, and yet which has a rich look and a rich, spongey feel. Of course, various modifications and variations will occur to those skilled in the art to which this invention pertains. For example, the shape of the cavity within the door pull and the exterior shape of the door pull can be adapted to provide the look and the feel desired. The particular mounting brackets for securing the door pull to the automobile door can vary from that disclosed herein. These and the other variations can be made without departing from the spirit and broader aspects of the invention.

The embodiments of the invention in which an exclusive property or privilege is claimed are defined as follows:

1. An automobile door pull comprising:
   an elongated metal insert;
   a molded body of a resilient, flexible material generally hat-shaped in cross section, defining in cross section a first body portion and an integrally molded smaller second body portion projecting therefrom; said first body portion having an elongated first cavity extending the length thereof;
   said metal insert being positioned within said first cavity; and
   an empty second elongated cavity within said smaller second body portion adjacent at least one side of said metal insert substantially parallel to the length of said metal insert and opening into said first cavity and occupying a substantial portion of the cross section of said smaller second body portion whereby said empty second cavity gives said door pull a cushiony feeling when it is grasped.

2. An automobile door pull as recited in claim 1 wherein said first cavity is larger in cross section than said metal insert and is partially empty adjacent said insert to further give said pull a cushiony feeling.

3. An automobile door pull as recited in claim 2 further comprising:
   said metal insert extending beyond each end of said first cavity to define a pair of attaching end segments at both ends of the automobile door pull;
   said body including a cover flap at each end separated from said metal insert and covering only one surface of one of said attaching end segments of said metal insert, the other surface of said end segment being exposed for attachment to an automobile door.

4. An automobile door pull as recited in claim 3 further comprising an attachment means connecting the door pull to the automobile door including:
   a first connecting means for securing the exposed attaching end segment of said metal insert to the automobile door;
   an end cap for securing to each said attaching end segment and to said separated flap end of said body; and
   a second connecting means for securing said end cap to said attaching end segment of said metal insert; said end cap including means receiving one of said flaps for holding said flap down.

5. An automobile door pull as recited in claim 2 wherein said elongated metal insert is removable from said body.

6. An automobile door pull as recited in claim 5 further comprising:
   said metal insert extending beyond each end of said first cavity to define a pair of attaching end segments at both ends of the automobile door pull;
   said body including a cover flap at each end separated from said metal insert and covering only one surface of one of said attaching end segments of said metal insert, the other surface of said end segment being exposed for attachment to an automobile door.

7. An automobile door pull as recited in claim 1 wherein said resilient flexible material of said body is soft polyvinyl chloride.

8. A method of fabricating an automobile door pull comprising the steps of:
   molding an elongated body of a resilient flexible material with an axial elongated interior first cavity and an adjacent interior second cavity of a slightly smaller cross section than said first cavity;
   inserting an elongated metal insert into said first cavity; and
   leaving said second cavity vacant.

9. A method of fabricating an automobile door pull as recited in claim 8 wherein the step of molding said body includes the step of:
   positioning at least one elongated removable core in a mold at the location of said cavities.

10. A method of fabricating an automobile door pull as recited in claim 8 wherein the step of inserting an elongated metal insert into said first cavity includes the step of:
    cooling the cover to a temperature of between about 100° and about 120° F. and inserting said metal insert at that time.

11. A method of fabricating an automobile door pull as recited in claim 10 wherein the step of molding said body includes the step of:
    forming a flap of resilient material at each end of said body so said interior first cavity is of a length less than the length of said body with flaps;
    said inserting step including providing a metal insert longer than said first cavity but shorter than said body with flaps such that one side of the ends of said metal insert is covered by said flaps and the other side of the metal insert extending beyond said first cavity is exposed.

12. A method of fabricating an automobile door pull as recited in claim 11 wherein the step of forming an elongated body includes the step of injection molding a soft polyvinyl chloride.

13. A method of fabricating an automobile door pull comprising the steps of:
 positioning an elongated metal insert in an injection mold for bonding a resilient material to the metal insert; and
 an elongated body of resilient molding flexible material laterally around said metal insert with an elongated interior cavity within said body and substantially parallel to said metal insert; and
 leaving said interior cavity vacant.

14. A method of fabricating an automobile door pull as recited in claim 13 wherein said molding step includes the step of:
 positioning an elongated removable core in the mold at the location of said elongated interior cavity and adjacent to said metal insert; and
 removing said removable core after said molding step is completed.

15. A method of fabricating an automobile door pull as recited in claim 14 wherein the step of molding said body includes the step of:
 inserting a second removable core adjacent said metal insert on a side thereof opposite said first mentioned removable core; removing said second removable core after said molding step is completed.

16. A method of fabricating an automobile door pull as recited in claim 14 wherein the step of molding said body includes the step of:
 forming a flap of resilient material at each end of said body so said interior first cavity is of a length less than the length of said body with flaps;
 said inserting step including providing a metal insert longer than said first cavity but shorter than said body with flaps such that one side of the ends of said metal insert is covered by said flaps and the other side of the metal insert extending beyond said first cavity is exposed.

17. A method of fabricating an automobile door pull as recited in claim 13 wherein the step of forming an elongated body includes the step of injection molding a soft polyvinyl chloride.

* * * * *